United States Patent
Hong et al.

(10) Patent No.: US 10,483,783 B2
(45) Date of Patent: Nov. 19, 2019

(54) SYSTEM AND METHOD FOR IDENTIFYING A WIRELESSLY CHARGING BATTERY

(71) Applicant: MOTOROLA SOLUTIONS, INC., Schaumburg, IL (US)

(72) Inventors: Yee Bing Hong, Penang (MY); Intan Mazlina Mohd Mohdi, Penang (MY); Huey Ghim Neoh, Penang (MY); Wei Lun Oo, Penang (MY); Mun Yew Tham, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 40 days.

(21) Appl. No.: 14/811,304

(22) Filed: Jul. 28, 2015

(65) Prior Publication Data
US 2017/0033587 A1     Feb. 2, 2017

(51) Int. Cl.
*H02J 7/00*     (2006.01)
*H02J 7/02*     (2016.01)
(Continued)

(52) U.S. Cl.
CPC ............ *H02J 7/025* (2013.01); *H02J 7/0013* (2013.01); *H02J 50/40* (2016.02); *H02J 50/80* (2016.02)

(58) Field of Classification Search
CPC ......... Y02E 60/12; H02J 7/025; H02J 7/0013; H02J 7/0003; H02J 7/0042; H02J 7/0045;
(Continued)

(56) References Cited

U.S. PATENT DOCUMENTS 6,016,046 A    1/2000   Kaite et al.
7,024,321 B1 *   4/2006   Deninger ........... G01R 31/3648
                                           320/113
(Continued)

FOREIGN PATENT DOCUMENTS

EP     1962365     8/2008
EP     2448037     5/2012
(Continued)

OTHER PUBLICATIONS

Clark, Mike "NXP Launches Dynamic NFC Tag Chip for Consumer Devices" NFC World+ http://nfcworld.com/2014/09/05/331218/nxp-launches-dynamic-nfc-chip-consumer-devices/ (Sep. 5, 2014).
(Continued)

*Primary Examiner* — Richard Isla
*Assistant Examiner* — Mohammed J Sharief
(74) *Attorney, Agent, or Firm* — Michael Best & Friedrich LLP

(57) ABSTRACT

A system and method for selecting a battery pack of a plurality of battery packs being wirelessly charged. The system includes a wireless charger having a power supply and a plurality of charging coils, each charging coil coupled to the power supply and configured to wirelessly charge a battery pack of the plurality of battery packs using power received via the power supply. The wireless charger communicates with each battery pack to receive battery information. The system further includes an optimal battery selection device configured to detect a battery pack request; select an optimal battery pack of the plurality of battery packs based on a battery pack request and battery information; and provide a notification indicative of the optimal battery pack selected.

20 Claims, 10 Drawing Sheets

(51) Int. Cl.
*H02J 50/40* (2016.01)
*H02J 50/80* (2016.01)

(58) Field of Classification Search
CPC ....... H02J 7/0016; H02J 7/0018; H01F 38/14; Y02T 90/122; Y02T 10/7055; B60L 11/182; H01M 10/46; H01M 10/441; H01M 10/425; G01R 31/3658
USPC .......... 320/106, 108, 110, 119, 120
See application file for complete search history.

(56) References Cited

U.S. PATENT DOCUMENTS

| | | | |
|---|---|---|---|
| 8,395,348 B1 | 3/2013 | Saatchi et al. | |
| 8,489,113 B2 | 7/2013 | Walter et al. | |
| 9,387,771 B1 | 7/2016 | Shekher | |
| 2005/0127867 A1* | 6/2005 | Calhoon | G06F 1/26 320/108 |
| 2007/0096691 A1 | 5/2007 | Duncan et al. | |
| 2009/0035609 A1* | 2/2009 | Ludtke | H01M 10/4257 429/10 |
| 2011/0156640 A1 | 6/2011 | Moshfeghi | |
| 2012/0013467 A1* | 1/2012 | Byun | H01M 10/4207 340/572.1 |
| 2012/0032631 A1* | 2/2012 | Bourilkov | H02J 7/025 320/108 |
| 2012/0043932 A1 | 2/2012 | Nakama | |
| 2012/0169279 A1* | 7/2012 | Kim, II | H02J 7/025 320/108 |
| 2013/0320080 A1 | 12/2013 | Olson et al. | |
| 2014/0176056 A1* | 6/2014 | Sedzin | H02J 7/0052 320/108 |
| 2014/0197687 A1* | 7/2014 | Lin | H02J 5/005 307/31 |
| 2014/0292267 A1 | 10/2014 | Ahn | |
| 2015/0042168 A1 | 2/2015 | Widmer | |
| 2015/0091498 A1 | 4/2015 | Abdelmoneum et al. | |
| 2015/0162781 A1 | 6/2015 | Fratti et al. | |
| 2015/0177330 A1* | 6/2015 | Morris | H02J 7/025 320/106 |
| 2015/0280488 A1 | 10/2015 | Wyrwas et al. | |
| 2016/0028251 A1* | 1/2016 | Hur | H02J 7/025 320/162 |
| 2016/0079781 A1* | 3/2016 | Kyriakoulis | H02J 7/0044 320/114 |
| 2016/0087484 A1 | 3/2016 | Kim | |
| 2016/0316544 A1 | 10/2016 | Rice | |
| 2017/0117738 A1 | 4/2017 | Yeoh et al. | |

FOREIGN PATENT DOCUMENTS

| | | | |
|---|---|---|---|
| EP | 2579421 | 4/2013 | |
| WO | WO 2006001557 A1 * | 1/2006 | .............. H02J 7/025 |
| WO | WO 2012165688 A1 * | 12/2012 | .............. H02J 7/025 |
| WO | WO-2012165688 A1 * | 12/2012 | .............. H02J 7/025 |
| WO | 2014167171 | 10/2014 | |
| WO | WO 2014205054 A1 * | 12/2014 | .......... G01R 31/3689 |

OTHER PUBLICATIONS

Sony Global "FeliCa—NFC Dynamic Tag (FeliCa Plug)—RC-S801/S802/S926" http://www.sony.net/Products/felica/business/products/RC-S801_802.html/ (accessed on Jun. 18, 2015).
ST Microelectronics "M24SR64-Y Dynamic NFC/RFID Tag IC with 64-Kbit EEPROM, NFC Forum Type 4 Tag and $I^2C$ Interface: Datasheet—Production Data" (Jan. 2015).
Texas Instruments "RF430CL330H Dynamic NFC Interface Transponder" (Nov. 2012, Revised Nov. 2014).
PCT/US2016/054212 International Search Report and Written Opinion of the Searching Authority dated Dec. 21, 2016 (12 pages).
PCT/US2016/042279 International Search Report and Written Opinion of the Searching Authortiy dated Oct. 17, 2016 (14 pages).
Office Action from the US Patent and Trademark Office for Application No. 14/922,559 dated Apr. 6, 2017 (32 pages).
Office Action from the US Patent and Trademark Office for Application No. 14/922,559 dated Nov. 1, 2017 (38 pages).
Office Action from the US Patent and Trademark Office for Application No. 14/922,559 dated Mar. 8, 2018 (33 pages).
Office Action from the U.S. Appl. No. 14/922,559 dated Sep. 20, 2018 (33 pages).

* cited by examiner

SYSTEM AND METHOD FOR IDENTIFYING A WIRELESSLY CHARGING BATTERY

BACKGROUND OF THE INVENTION

A wide variety of battery-powered devices are available, for example mobile phones, global positioning satellite (GPS) navigation systems, tablets, laptops, and wireless headsets. The portability offered by battery-powered devices is advantageous in many ways. However, a drawback of battery-powered devices is the frequent need to recharge the battery so that the devices can continue to be used.

Multi-unit chargers have been developed to simultaneously charge multiple battery packs, reducing the total time to charge a plurality of battery packs. Conventional multi-unit chargers include electro-mechanical connections between the charger and each battery pack to be charged and a charge indicator for each battery pack. When a user wishes to replace a depleted battery on his or her mobile device, the user may visually scan the indicators to select the replacement battery pack having the highest charge. While multi-battery pack chargers increase the number of batteries that can be charged, users are still required to purchase a multi-unit charger for each type of battery pack because the electro-mechanical connections of each charger are particularly configured for only certain types of battery packs.

Accordingly, there is a need for improved systems and methods for identifying a wirelessly charging battery.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
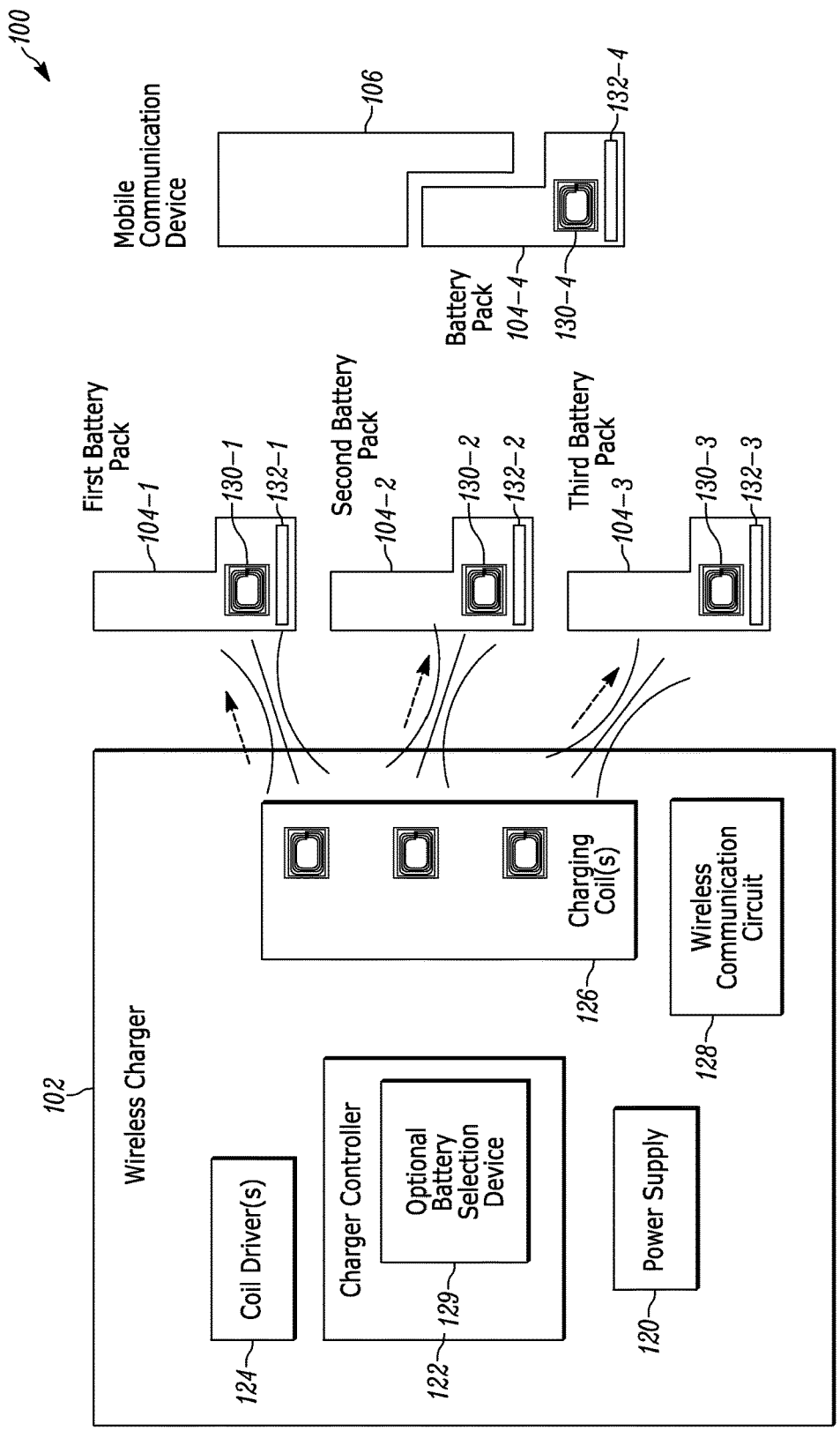
FIG. 1 illustrates a wireless battery charging system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments of the invention include a method of selecting a battery pack of a plurality of battery packs being wirelessly charged. The method includes wirelessly charging the plurality of battery packs using the wireless charger and detecting a battery pack request. The method further includes receiving, by an optimal battery selection device, battery information from the plurality of battery packs. The optimal battery selection device further selects an optimal battery pack of the plurality of battery packs based on the battery pack request and the battery information. The optimal battery selection device also provides a notification of the optimal battery pack.

Some embodiments of the invention include a system for selecting a battery pack of a plurality of battery packs being wirelessly charged. The system includes a wireless charger and an optimal battery selection device. The wireless charger includes a power supply and a plurality of charging coils, each charging coil coupled to the power supply and configured to wirelessly charge a battery pack of the plurality of battery packs using power received via the power supply. The wireless charger further includes a wireless communication circuit forming a communication link with each battery pack. The optimal battery selection device has battery information including information received from the battery packs via the wireless communication circuit. The optimal battery selection device is configured to detect a battery pack request; determine a optimal battery pack of the plurality of battery packs based on the battery pack request and the battery information; and provide a notification indicative of the optimal battery pack.

A universal, wireless battery charger enables simultaneously charging multiple battery packs of different shapes, sizes and types, as no specific electro-mechanical connection is required. Further, a user does not need to remove a battery pack coupled to and powering a mobile device before charging the battery pack. However, without the electro-mechanical connection, the conventional wireless charger is not able to detect the charge level of a battery pack. Accordingly, the charger is not able to convey the charge level of the various battery packs on the wireless battery charger to a user wishing to replace a low battery pack with a charged battery pack. Thus, a user typically must select one battery pack at a time, insert the battery pack into the mobile device, and wait until the mobile device powers up to indicate the charge of the selected battery pack. It may take several attempts before a fully or adequately charged battery pack is discovered by the user, creating delay and inconvenience when switching battery packs.

Further still, it is not always readily apparent which battery packs on a universal charger are compatible with a particular mobile device. Again, a user may need to test the battery packs one-by-one to determine whether they are able to couple to and power a particular mobile device. Embodiments discussed herein address one or more of these issues.

FIG. 1 schematically illustrates a wireless charging system 100 including a wireless charger 102, a first battery pack 104-1, a second battery pack 104-2, a third battery pack 104-3, a fourth battery pack 104-4, and a mobile communication device 106. The first battery pack 104-1, second battery pack 104-2, third battery pack 104-3, and fourth battery pack 104-4 may be generically referred to as battery packs 104. It will be appreciated that any number of battery packs could be included in the implementation of this invention. The wireless charger 102 is a charger that charges one or more of the battery packs 104 simultaneously and wirelessly via induction, without an electro-mechanical connection between the battery packs 104 and the wireless charger 102. The battery packs 104 may be of different types having one or more of different power output levels, capacities, physical and electrical interfaces, and housing configurations, among other variations. Accordingly, the wireless charger 102 may be referred to as a "universal" charger. Alternatively, in some embodiments, some or all of the battery packs 104 could be of the same type.

Each battery pack 104 is able to be coupled to and provide power to a mobile communication device, such as the mobile communication device 106. For instance, in FIG. 1, the battery pack 104-4 is coupled to the mobile communication device 106. The mobile communication device 106 is, for instance, a two-way radio. In other embodiments, the mobile communication device 106 is a smart telephone, tablet, laptop computer, or another mobile electronic device with communication capability having rechargeable battery packs. The wireless charger 102 is further configured to wirelessly charge the battery pack 104-4 while the battery pack 104-4 is coupled to the mobile communication device 106. In other words, the battery pack 104-4 may be, but does not need to be, removed from the mobile communication device 106 to be charged by the wireless charger 102.

The wireless charger 102 includes a power supply 120, a charger controller 122, coil drivers 124, charging coils 126, and a wireless communication circuit 128. The power supply 120 includes, for instance, a power input port to connect the wireless charger 102 to an external power source, such as a standard wall outlet (e.g., at 120 volts, 60 hertz), a photovoltaic cell, an internal-combustion-engine driven, electric power generator, a 12 volt (vehicle) battery, or another source. The power supply 120 further includes conditioning circuitry to condition received power from the external source to levels adequate for usage by other components of the wireless charger 102. For instance, in some embodiments, the power supply includes a rectifier to convert alternating current (AC) power received from a standard wall outlet to direct current (DC) power for supply to various components within the wireless charger 102, including the charger controller 122, coil drivers 124, charging coils 126, and wireless communication circuit 128.

The first battery pack 104-1 includes a first recipient coil 130-1 and one or more first battery cells 132-1; the second battery pack 104-2 includes a second recipient coil 130-2 and one or more second battery cells 132-2; the third battery pack 104-3 includes a third recipient coil 130-3 and one or more third battery cells 132-3; and the fourth battery pack 104-4 includes a fourth recipient coil 130-4 and one or more fourth battery cells 132-4. The recipient coils 130-1, 130-2, 130-3, 130-4 are generically referred to as the recipient coils 130 and the battery cells 132-1, 132-2, 132-3, and 132-4 are generically referred to as the battery cells 132.

The charger controller 122 controls components of the wireless charger 102 to charge the battery packs 104. More particularly, to charge the battery packs 104, the charger controller 122 selectively controls the coil drivers 124 to drive the charging coils 126 using power received from the power supply 120. The coil drivers 124 may include power transistors, such as field effect transistors, selectively enabled and disabled by the charger controller 122 to provide an alternating or fluctuating current. Driving the charging coils 126 includes providing the fluctuating electric current generated by the coil drivers 124 to the charging coils 126. The fluctuating electric current within each of the charging coils 126 produces a changing magnetic field.

The changing magnetic field of each charging coil 126 is received by the recipient coil 130 of each of the battery packs 104, which induces a fluctuating electric current within the recipient coils 130. This fluctuating electric current induced in the recipient coils 130 may be referred to as charging current. The charging current is received, conditioned, and applied to one or more battery cells 132 within the battery packs 104 to charge the battery packs 104. Accordingly, power is wirelessly transferred from charging coils 126 to the recipient coils 130; resulting in the wireless charger 102 wirelessly charging the battery packs 104.

In the illustrated embodiment, the wireless charger 102 includes one charging coil 126 per battery pack 104 that the wireless charger 102 is configured to charge simultaneously. Accordingly, as illustrated in FIG. 1, the wireless charger 102 is configured to simultaneously charge three battery packs 104. In other embodiments, more or fewer charging coils are provided within the wireless charger 102 such that more or fewer battery packs 104 may be simultaneously charged by the wireless charger 102. As described in further detail below, the charging coils 126 may be selectively driven such that none, one, some, or all of the charging coils 126 are driven at a given moment in time.

The wireless communication circuit 128 communicates with the battery packs 104, the mobile communication device 106, or both, as is described in further detail below. The charger controller 122 further includes an optimal battery selection device 129, which is described in further detail below.

Figure 2A:
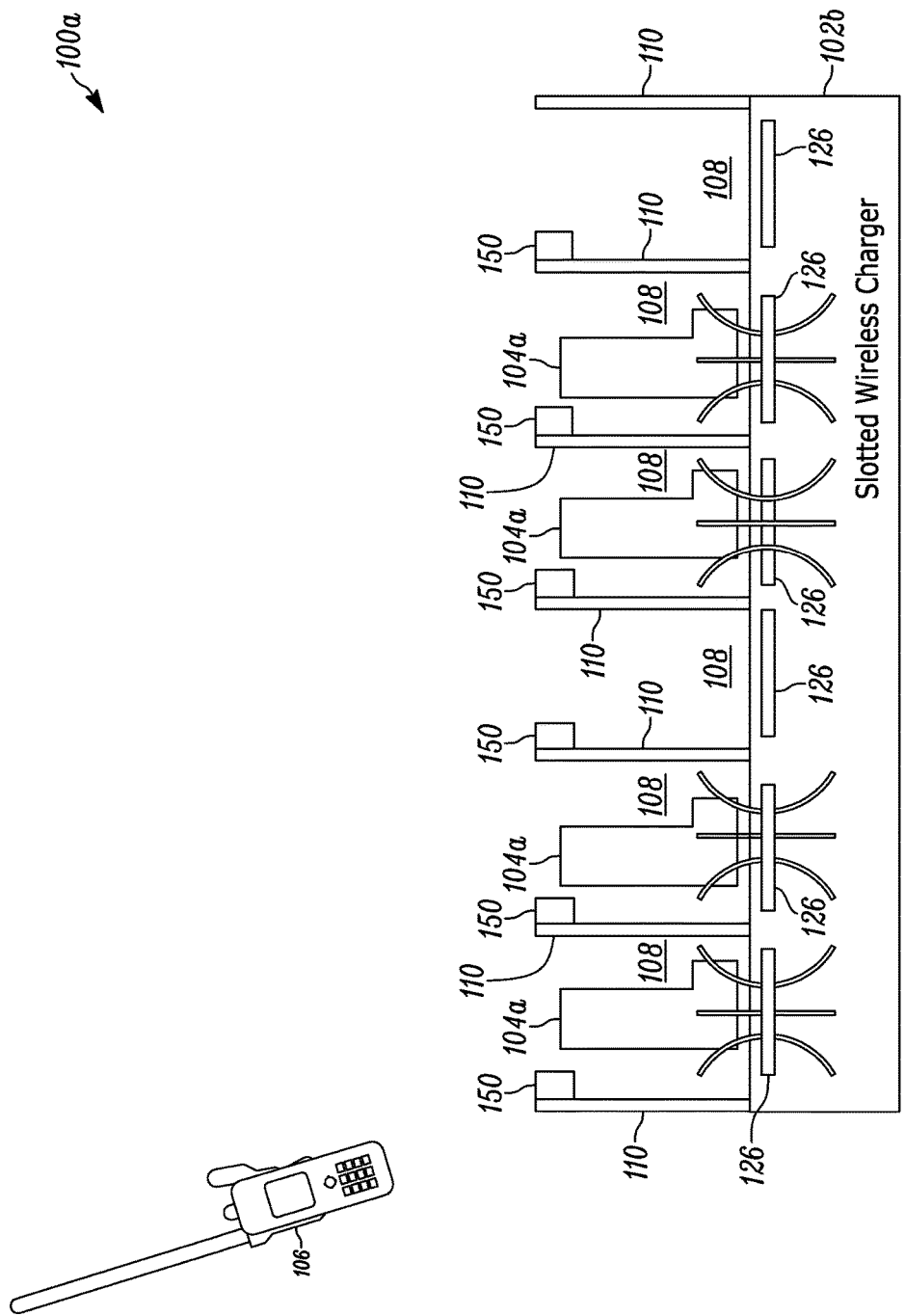
FIG. 2A illustrates an embodiment of the wireless charging system of FIG. 1 including a slotted wireless charger.
Figure 2B:
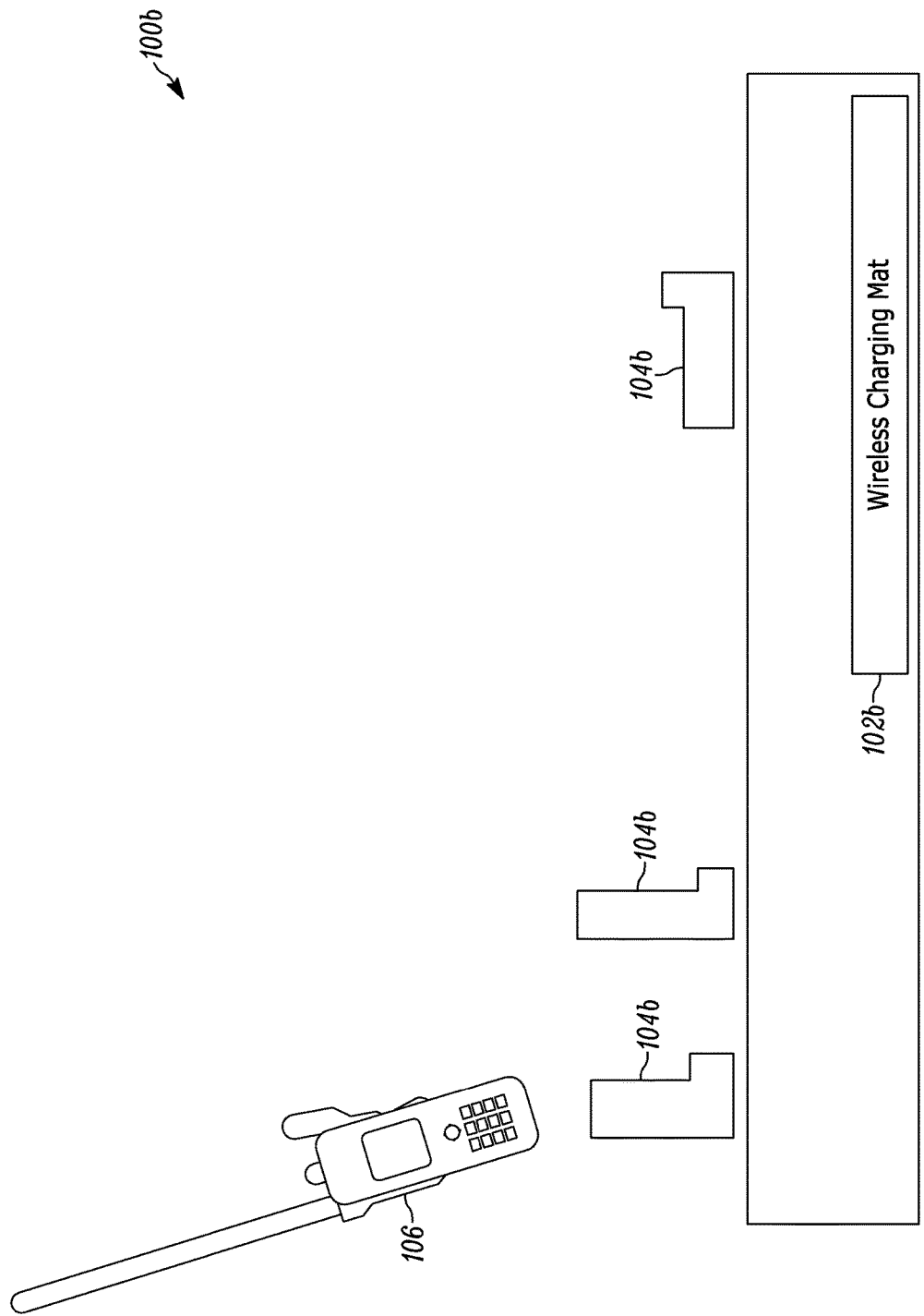
FIG. 2B illustrates an embodiment of the wireless charging system of FIG. 1 including a wireless charger mat.

FIGS. 2A and 2B illustrate a slotted wireless charging system 100a and a wireless mat charging system 100b, respectively, which are exemplary embodiments of the wireless charging system 100. As shown in FIG. 2A, the slotted wireless charging system 100a includes a slotted wireless charger 102a having charging slots 108 separated by partitions 110. Each charging slot 108 is configured to receive a tag battery pack 104a. The slotted wireless charger 102a is an embodiment of the wireless charger 102 and the tag battery packs 104a are an embodiment of the battery packs 104. The slotted wireless charger 102a includes six charging slots 108, each with an associated charging coil 126. Each of the charging coils 126 is positioned generally below one of the charging slots 108.

As shown in FIG. 2B, the wireless mat charging system 100b includes a wireless charger mat 102b having a mat surface 112 that is generally planar and receives transceiver battery packs 104b thereon. The wireless charger mat 102b is an embodiment of the wireless charger 102 and the transceiver battery packs 104b are an embodiment of the battery packs 104. In the wireless charger mat 102b, the charging coils 126 are distributed in various locations below the mat surface 112. The charging coils 126 may overlap one another or be positioned such that the charging coils 126 do not overlap one another. The charging coils 126 are generally planar coils, although other coil shapes may be used in other embodiments. Each individual charging coil 126 is able to charge a separate transceiver battery pack 104b.

Figure 3A:
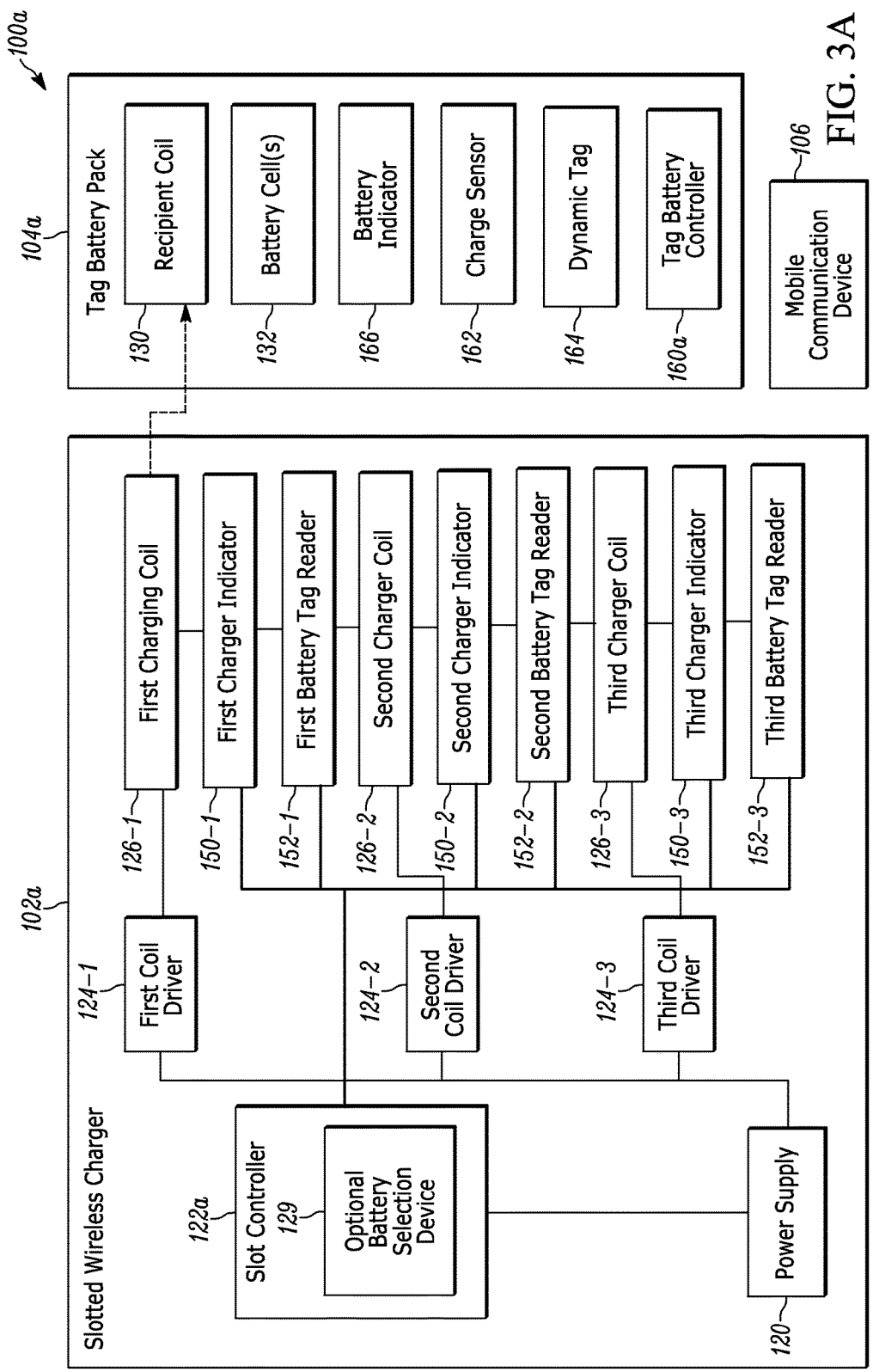
FIG. 3A illustrates a block diagram of the wireless charging system of FIG. 2A.
Figure 3B:
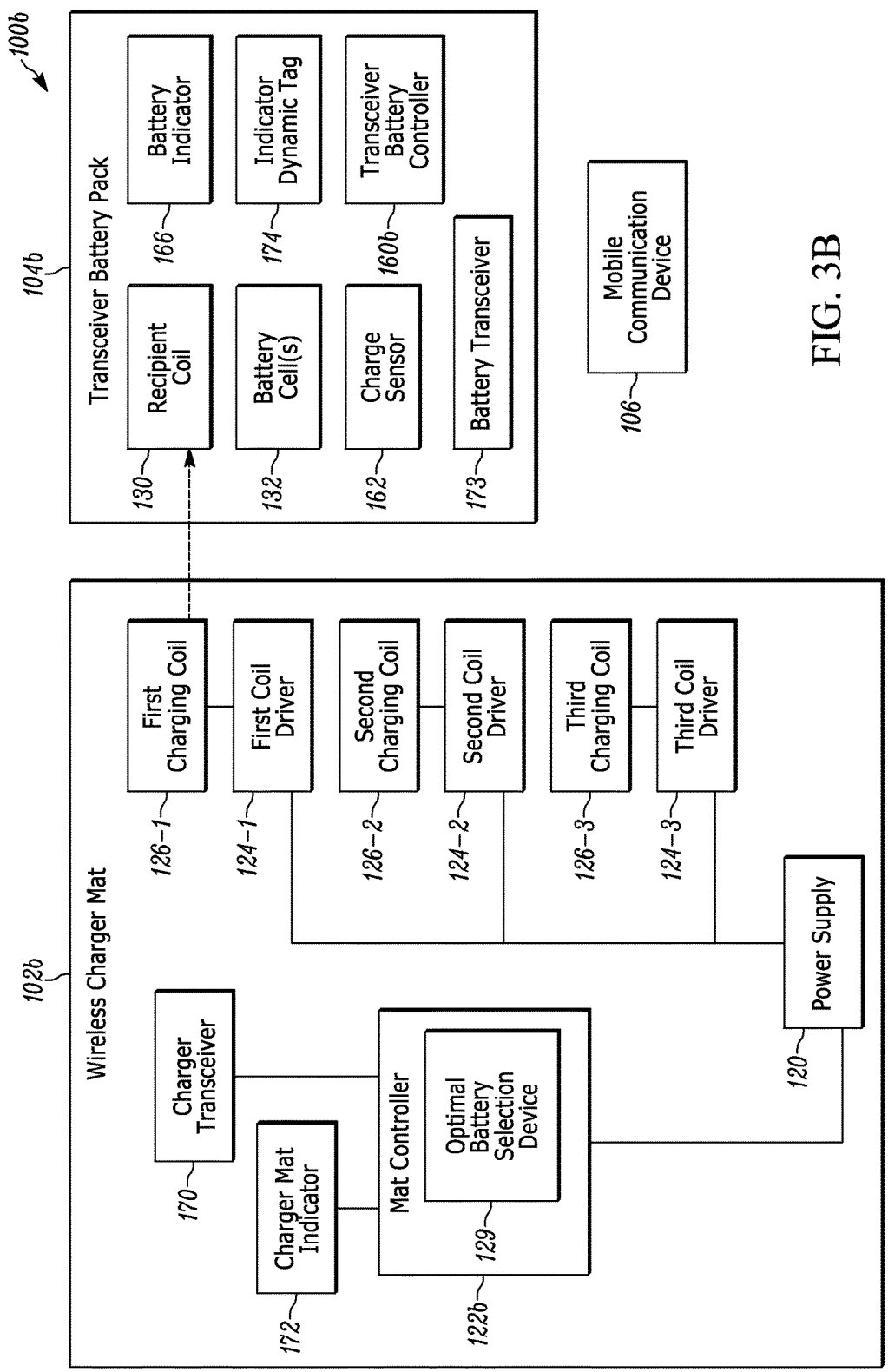
FIG. 3B illustrates a block diagram of the wireless charging system of FIG. 2B.

FIGS. 3A and 3B illustrate the wireless charging systems 100a and 100b, respectively, in further detail. Rather than the six charging coils as illustrated in FIG. 2A, in FIG. 3A, to simplify the description and drawing, the slotted wireless charger 102a is illustrated with three coil drivers and three coils: first coil driver 124-1, second coil driver 124-2, and third coil driver 124-3 (generally, coil drivers 124), as well as first charging coil 126-1, second charging coil 126-2, and third charging coil 126-3 (generally, charging coils 126). Further, while the slotted wireless charger 102a is shown with one of the tag battery packs 104a and the wireless charger mat 102b is shown with one of the transceiver battery packs 104b, each charger is able to simultaneously charge additional battery packs (e.g., one battery pack per charging coil).

The slotted wireless charger 102a further includes a charger indicator and a battery tag reader for each charging coil 126-1, 126-2, and 126-3. More particularly, the first charging coil 126-1 is associated with a first charger indicator 150-1 and a first battery tag reader 152-1; the second charging coil 126-2 is associated with a second charger indicator 150-2 and a second battery tag reader 152-2, and the third charging coil 126-3 is associated with a third charger indicator 150-3 and a third battery tag reader 152-3. The charger indicators 150-1, 150-2, and 150-3 are generally referred to as charger indicators 150, and the battery tag readers 152-1, 152-2, and 152-3 are generally referred to as battery tag readers 152. The battery tag readers 152 are, collectively, an embodiment of the wireless communication circuit 128. The slotted wireless charger 102a further includes a slot controller 122a, which is an embodiment of the charger controller 122 that is also coupled to and controls the charger indicators 150 and is coupled to the battery tag readers 152 to enable communication with the tag battery packs 104a.

FIG. 3A illustrates one of the tag battery packs 104a in further detail. The tag battery pack 104a includes a tag battery controller 160a, a charge sensor 162, a dynamic tag 164, and a battery indicator 166. The tag battery controller 160a is coupled to and powered by the battery cells 132. The battery cells 132 may include one or more battery cells, such as lithium ion cells or cells of another cell chemistry type. The tag battery controller 160a is further coupled to and communicates with the charge sensor 162, the dynamic tag 164, and the battery indicator 166. The charge sensor 162 provides an indication of the state of charge (i.e., charge level) of the battery cells 132 to the tag battery controller 160a. For instance, the charge sensor 162 may include a voltage sensor that indicates the voltage level of the battery cells 132, from which the tag battery controller 160a can infer the state of charge of the battery cells 132. The dynamic tag 164 and the battery tag reader 152 can form a communication link enabling the tag battery controller 160a to communicate with the charger controller 122.

Figure 5:
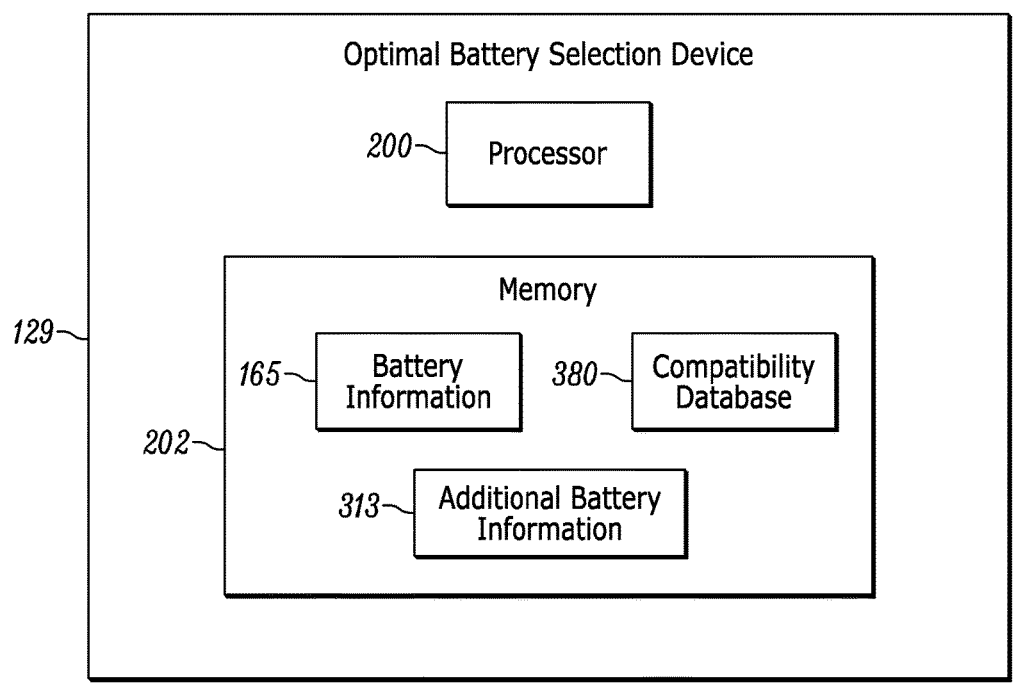
FIG. 5 illustrates an optimal battery selection device in accordance with embodiments of the invention.

Communications between the dynamic tag 164 and the battery tag reader 152 provide the slotted wireless charger 102a, particularly the optimal battery selection device 129 of the slot controller 122a, with data forming battery information 165 (see FIG. 5). For instance, the tag battery controller 160a detects the charge level of the battery cells 132 and provides an indication of the charge level of the battery cells 132 to the slot controller 122a. Additionally, the tag battery controller 160a sends to the slot controller 122a identifying information that identifies the tag battery pack 104a by type (e.g., by model number or serial number), the manufacture date of the battery pack 104, the number of charges or discharges that the tag battery pack 104a has experienced, the capacity of the tag battery pack 104a (e.g., in ampere-hours), and other battery characteristics. The slot controller 122a may use the received battery information 165 to control charging of the tag battery packs 104a. For instance, the slot controller 122a may cease charging the tag battery pack 104a when the received battery information 165 indicates that the battery cells 132 are fully charged. Additionally, the slot controller 122a may detect the presence of the tag battery pack 104a within one of the charging slots 108 based on a communication from the dynamic tag 164 to a particular one of the battery tag readers 152.

In some embodiments, the dynamic tag 164 is a dynamic near field communication (NFC) tag, and the battery tag reader 152 is a near field communication (NFC) tag reader. In other embodiments, the dynamic tag 164 is a radio frequency identification (RFID) tag, a Bluetooth communication circuit, a Wi-Fi communication circuit, or another short-range wireless communication circuit, and the battery tag reader 152 is compatible with the dynamic tag 164. For instance, the battery tag reader 152 is a radio frequency identification (RFID) tag reader, a Bluetooth communication circuit, a Wi-Fi communication circuit, or another short-range wireless communication circuit. The communications between the dynamic tag 164 and the battery tag reader 152 may be unidirectional or bi-directional, depending on the selected communication protocol and hardware, and the particular embodiment.

The tag battery controller 160a is also configured to enable and disable charging and discharging of the battery cells 132, for instance, through control of field effect transistors (FETs) (not shown) coupled to terminals of the battery cells 132. Accordingly, the tag battery controller 160a is configured to cease charging of the battery cells 132 even when charging current is being generated by the recipient coil 130 by one of the charging coils 126.

The charger indicators 150 and battery indicator 166 provide human-perceptible indications via one or more of a light source (e.g., light emitting diode), auditory source (e.g., speaker), or tactile feedback source (e.g., vibration generator). A human-perceptible indication can take the form of one or more of a visual indication (e.g., a flashing and/or color-coded light or an alphanumeric message on a multi-pixel or multi-segment digital display); an audible indication (e.g., a beep, buzzer, or other alert sound on a speaker, or a pre-recorded voice message on a speaker); or a vibratory indication. The instances in which such indications are provided are discussed in further detail herein.

In FIG. 3B, the wireless charger mat 102b includes a charger transceiver 170 and a mat charger indicator 172. The charger transceiver 170 is an embodiment of the wireless communication circuit 128 and forms a communication link with a battery transceiver 173 of the transceiver battery pack 104b. The communication link enables bi-directional communications between the mat controller 122b and the transceiver battery controller 160b. In some embodiments, the charger transceiver 170 and the battery transceiver 173 are Bluetooth communication circuits that communicate according to the Bluetooth protocol. In other instances, the charger transceiver 170 and the battery transceiver 173 are near field communication (NFC) circuits, Wi-Fi communication circuits, or communication circuits for implementing another form of short-range wireless communications.

The battery transceiver 173 of the transceiver battery pack 104b is powered by power harvested via the recipient coil 130. Accordingly, the battery transceiver 173 does not drain power from the battery cells 132. In other embodiments, however, the battery transceiver 173 is powered in part or entirely by the battery cells 132. Additionally, the transceiver battery pack 104b includes an indicator dynamic tag 174. The remaining illustrated components in the transceiver battery pack 104b having like numbers as components in the tag battery pack 104a are similar thereto.

Figure 4:
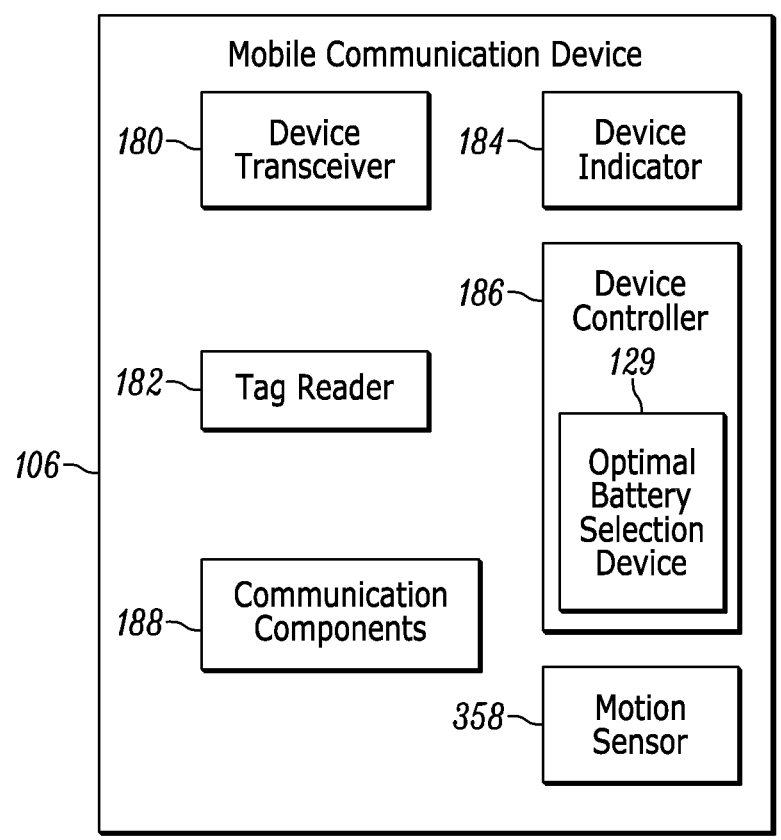
FIG. 4 illustrates a mobile communication device of the wireless charging system of FIG. 1.

FIG. 4 illustrates the mobile communication device 106 in further detail. The mobile communication device 106 includes a device transceiver 180, a tag reader 182, a device indicator 184, and a device controller 186. The mobile communication device 106 further includes communication components 188, which are typical components found in a mobile communication device enabling it to communicate according to standard protocols. For instance, in the case of a two-way radio, the mobile communication device 106 includes a two-way radio transceiver, display device, user input soft and/or hard keys, speaker, and microphone. The device transceiver 180 forms a bi-directional communication link with the charger transceiver 170 such that the device controller 186 and the mat controller 122b can communicate. The tag reader 182 reads tag data from the indicator dynamic tags 174 in the transceiver battery packs 104b. In some embodiments, such as some instances of the wireless mat charging system 100b, the tag reader 182 is not provided. The device indicator 184 provides a human-recognizable indication, similar to the indicators 150 and 166 described above. The device controller 186 controls the device transceiver 180 for communications with the wireless charger mat 102b, control the tag reader 182 to obtain the tag data from the indicator dynamic tags 174, and control the device indicator 184 to generate the human-recognizable indications. Further, the device controller 186, in some embodiments, controls the communication components 188 to carry out the non-charger communication functions of the mobile communication device 106, such as the two-way radio communications. Additionally, as illustrated, the device controller 186 includes the optimal battery selection device 129. In some embodiments, the wireless charger 102 includes the optimal battery selection device 129, and the device controller 186 does not include the optimal battery selection device 129. In some embodiments, the device controller 186 includes the optimal battery selection device 129, and the wireless charger 102 does not include the optimal battery selection device 129. In some embodiments, such as illustrated, both the wireless charger 102 and the device controller 186 include the optimal battery selection device 129.

FIG. 5 illustrates the optimal battery selection device 129 in further detail. The optimal battery selection device 129 includes a processor 200 and a memory 202. The processor 200 is configured to read and write instructions and data to the memory 202 and to execute instructions (e.g., from the memory 202) to carry out functionality of the optimal battery selection device 129 described herein. For example, as described in greater detail below, the processor 200 is configured to select an optimal battery pack of the battery packs 104 present at the wireless charger 102.

The optimal battery selection device 129, its functions as described below, or both, are illustrated as being incorporated into a controller of the wireless charger 102 and mobile communication device 106. In some embodiments, the processor 200 and the memory 202 of the optimal battery selection device 129 are used to carry out the other functionality of the controller in which the optimal battery selection device 129 resides. For instance, the processor 200 may also be used to control components of the wireless charger 102 (e.g., coil drivers 124) to charge the battery packs 104. In other embodiments, the respective controller having the optimal battery selection device 129 includes separate processing and memory elements to carry out charging or other functionality. In still further embodiments, the optimal battery selection device 129 is incorporated as a stand-alone device in the wireless charger 102 or mobile communication device 106, separate from the charger controller 122 or device controller 186, as the case may be.

Figure 6:
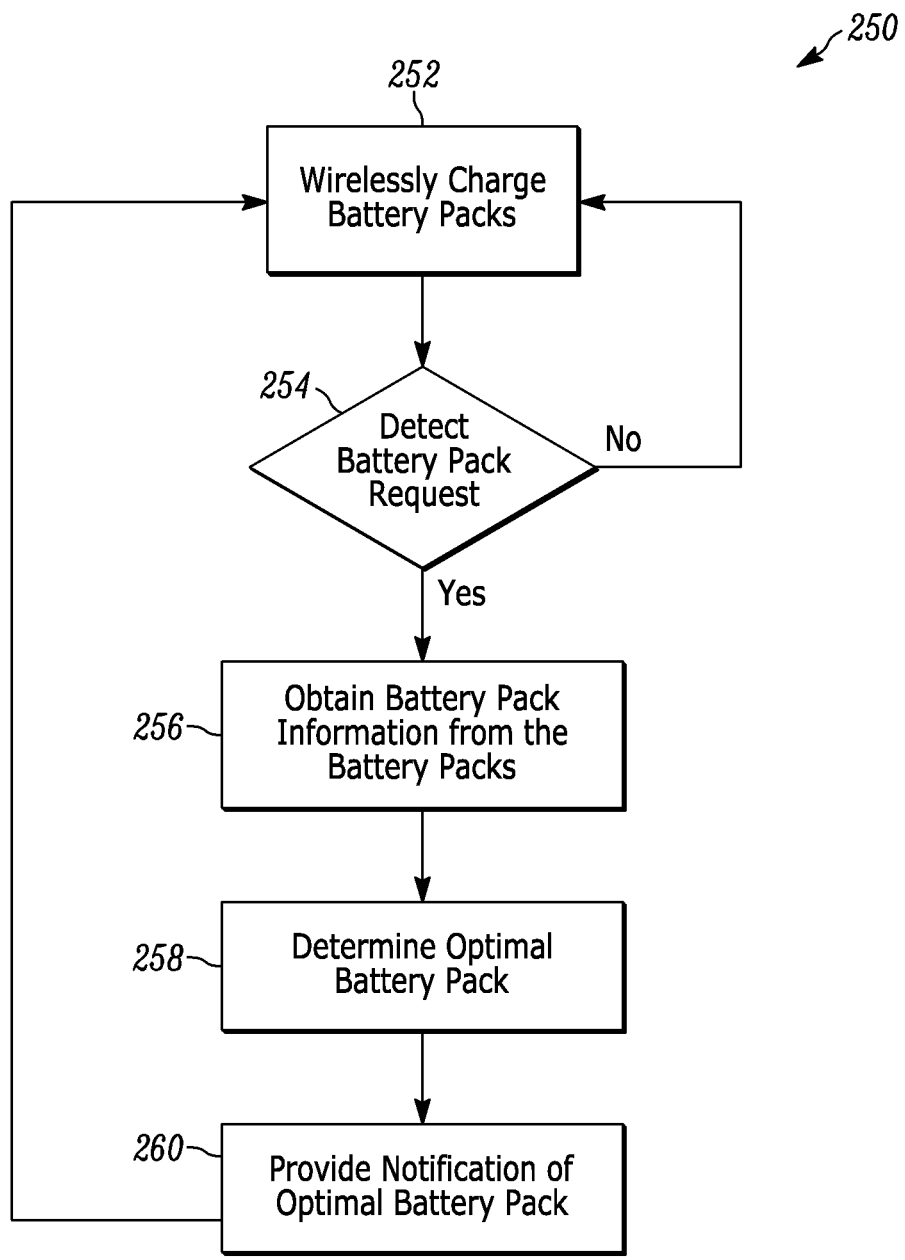
FIG. 6 is a flowchart of a method of wireless charging including selecting an optimal battery pack on a wireless charger in accordance with some embodiments.

FIG. 6 illustrates a method 250 for wirelessly charging a plurality of battery packs using an embodiment of the wireless charging system 100, such as the wireless charging systems 100a or 100b. In block 252, the wireless charger 102 wirelessly charges a plurality of the battery packs 104. In block 254, the optimal battery selection device 129 detects a battery pack request indicating a desire for a replacement battery pack. In block 256, optimal battery selection device 129 receives the battery information 165 from the battery packs 104 being charged or in communication with the wireless charger 102. In block 258, the optimal battery selection device 129 determines an optimal battery pack based on the battery pack request and the battery information 165. In block 260, based on the determination, the optimal battery selection device 129 provides a notification of the optimal battery pack. Each of the blocks is explained in further detail below.

Figure 7:
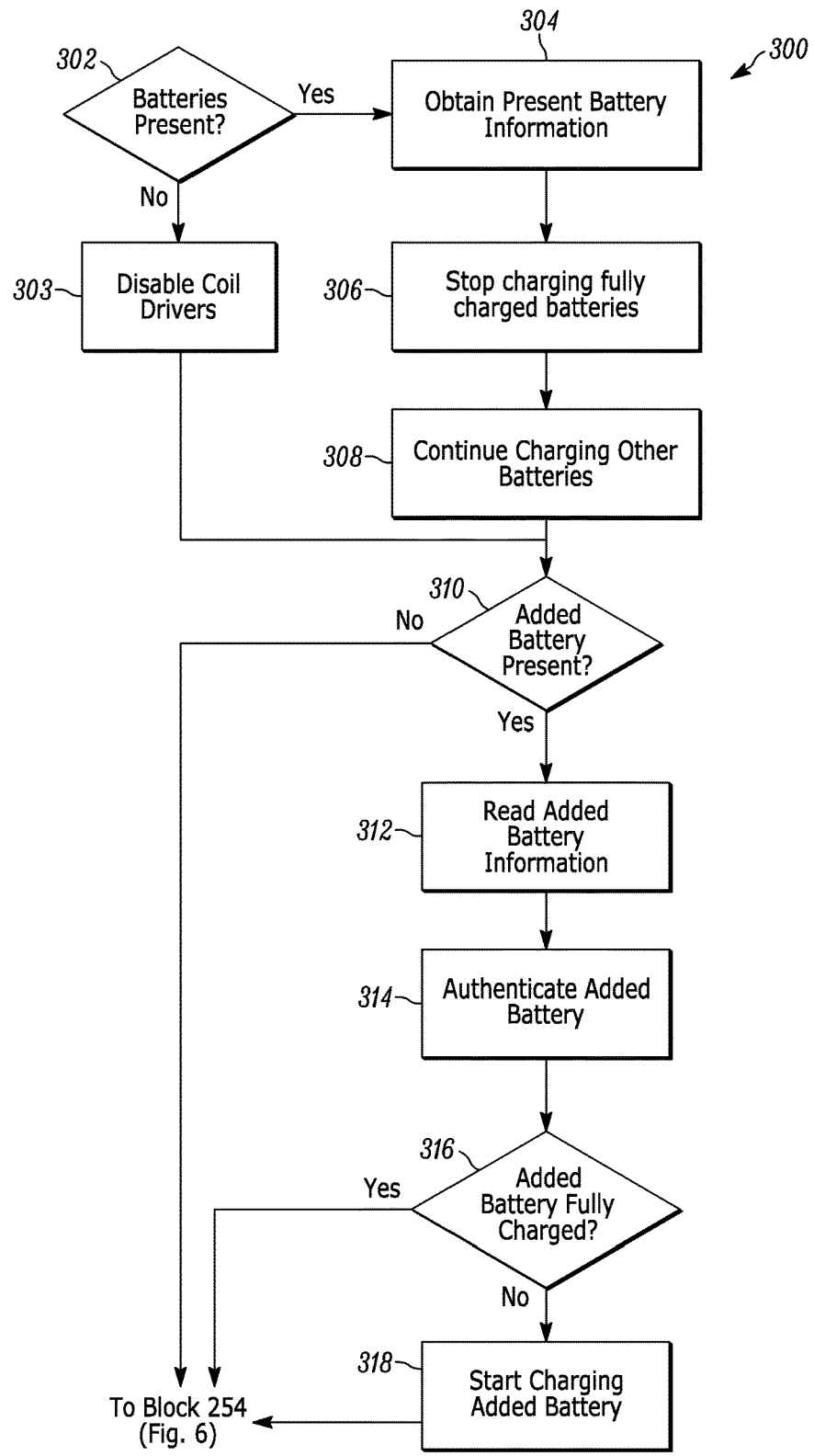
FIG. 7 is a flowchart of a method of wireless charging in accordance with some embodiments.

FIG. 7 illustrates an exemplary wireless charging method 300 for implementing the block 252 of FIG. 5. In block 302, the wireless charger 102 determines whether one or more battery packs 104 are already present at the wireless charger 102. For instance, the wireless chargers 102a and 102b may detect the presence (and absence) of battery packs 104 based on detecting (and not detecting) broadcast messages or other communications from the tag battery packs 104a and transceiver battery packs 104b received via the battery tag readers 152 and charger transceiver 170, respectively. A battery pack 104 within wireless charging range of the wireless charger 102 is considered to be a present battery pack 104. For instance, a transceiver battery pack 104b that is on the wireless charger mat 102b and a tag battery pack 104a that is within a charging slot 108 of the slotted wireless charger 102a are examples of battery packs 104 that are present. When no battery packs 104 are present, as determined in block 302, the wireless charger 102 proceeds to block 303, where the charger controller 122 disables the coil drivers 124 to cease driving of the charging coils 126.

When one or more battery packs 104 are present, in block 304, the wireless charger 102 obtains battery information from each of the battery packs 104 that are present. The battery information, which can form or update the battery information 165, includes a battery type and charge level for each battery pack 104 present on the wireless charger 102. For instance, the wireless charger 102 receives charge status information for each battery pack 104 on the wireless charger 102 based on data periodically pushed to the wireless charger 102 by the battery packs 104 or in response to periodic requests from the wireless charger 102 (e.g., each time the wireless charger executes block 304). The charge status information indicates whether the associated battery pack 104 is fully charged, the current charge level of the battery pack 104, or both. The charge level may take the form of a relative charge value for the battery pack 104 (e.g., a percentage of charge capacity of the battery pack 104) or an absolute charge level (e.g., expressed as a coulomb count).

To determine the charge level of one of the tag battery packs 104a, the tag battery controller 160a detects the charge level of the battery cells 132 based on output from the charge sensor 162, and writes the charge level to the dynamic tag 164. The battery tag reader 152 associated with the particular tag battery pack 104*a* then reads the charge level from the dynamic tag 164 and provides the charge level to the slot controller 122*a*.

To determine the charge level of one of the transceiver battery packs 104*b*, the transceiver battery controller 160*b* detects the charge level of the battery cells 132 based on output from the charge sensor 162. The transceiver battery controller 160*b* then uses the battery transceiver 173 to communicate the charge level to the charger transceiver 170, which forwards the received charge level to the mat controller 122*b*. The transceiver battery controller 160*b*, like the battery transceiver 173, may be powered by power obtained via the recipient coil 130. Accordingly, the communications between the wireless charger mat 102*b* and the transceiver battery packs 104*b* may be performed without draining power from the battery cells 132. In some instances, the transceiver battery controller 160*b* and the battery transceiver 173 are in a standby or low power mode when no power is available via the recipient coil 130. Then, upon receipt of power via the recipient coil 130, the transceiver battery controller 160*b* and the battery transceiver 173 enter into a normal or active mode. For example, current induced in the recipient coil 130 may cause a signal to be received by a pin of the transceiver battery controller 160*b*, which causes the transceiver battery controller 160*b* to exit the standby mode and enter the normal mode. In turn, the transceiver battery controller 160*b* sends a signal to cause the battery transceiver 173 to exit the standby mode and enter the normal mode.

In block 306, the wireless charger 102 stops charging those battery packs 104 determined to be fully charged. For instance, to stop charging one of the tag battery packs 104*a* with the slotted wireless charger 102*a*, the slot controller 122*a* controls each coil driver 124 associated with a fully charged tag battery pack 104*a* to stop driving the associated charging coil 126. In another example, to stop charging one of the transceiver battery packs 104*b* with the wireless mat charging system 100*b*, the transceiver battery controller 160*b* of each fully charged transceiver battery pack 104*b* is able to stop charging current from reaching the battery cells 132, e.g., by opening a power switching element (not shown) between the recipient coil 130 and the battery cells 132.

In block 308, the wireless charger 102 continues to charge the battery packs 104 that are not fully charged, as determined in block 304.

After block 308 and 303, the wireless charger 102 proceeds to block 310. In block 310, the wireless charger 102 determines whether an added battery pack is newly present, e.g., based on communications received by one of the battery tag readers 152 or the charger transceiver 170. For instance, the battery tag readers 152 may periodically scan for dynamic tags 16. When a user places one of the tag battery packs 104*a* into one of the charging slots 108, the battery tag reader 152 reads the dynamic tag 164, which indicates to the slot controller 122*a* that an added battery pack (the tag battery pack 104*a* inserted) is present on the slotted wireless charger 102*a*. Similarly, the charger transceiver 170 may periodically scan for new communications from a battery transceiver 173 of one of the transceiver battery packs 104*b*, which may periodically broadcast a presence signal. When the presence signal is detected, the mat controller 122*b* determines that an added transceiver battery pack 104*b* is present on the wireless charger mat 102*b*. When no added battery pack 104 is detected, the wireless charger 102 exits method 300 and proceeds to block 254 (see FIG. 5).

When one of the battery packs 104 is detected as an added battery pack present at the wireless charger 102, in block 312, the wireless charger 102 and the optimal battery selection device 129 obtains additional battery information 313 from the added battery pack 104. The additional battery information 313 includes charge level, identifying information, as well as other information, as discussed above with respect to obtained battery information 165. The additional battery information 313 is received via one of the battery tag readers 152 in the slotted wireless charger 102*a* and via the charger transceiver 170 in the wireless charger mat 102*b*. In some instances, the additional battery information 313 may be received as part of block 310. Stated another way, the wireless charger 102 may detect an added battery pack based on receiving the additional battery information 313.

In block 314, the wireless charger 102 authenticates the added battery pack 104, for instance, to determine whether the added battery pack 104 is compatible with the wireless charger 102. Although not shown, when the added battery pack 104 is not able to be authenticated, the added battery pack 104 is not provided charging power and the wireless charger 102 exits method 300 and proceeds to block 254 (see FIG. 6).

After authentication, in block 316, the wireless charger 102 determines whether the added battery pack 104 is fully charged. If so, the wireless charger 102 does not begin charging the added battery pack 104 and proceeds to block 254 (see FIG. 6). When the added battery pack 104 is not fully charged, the wireless charger 102 begins charging the added battery pack 104 in block 318 and then proceeds to block 254 (see FIG. 6).

Returning to FIG. 6, in block 254, the optimal battery selection device 129 detects whether a battery pack request has been made. A battery pack request is, generally, a request for the optimal battery selection device 129 to indicate an optimal battery pack. A battery pack request is detected by the optimal battery selection device 129 using various techniques. In one embodiment, the optimal battery selection device 129 within the slotted wireless charger 102*a* detects a battery pack request based on insertion of an added tag battery pack 104*a* into one of the charging slots 108. The optimal battery selection device 129 infers from the insertion of an added tag battery pack 104*a* that the user is requesting to replace the added tag battery pack 104*a* with another tag battery pack 104*a* present on the slotted wireless charger 102*a*. In these embodiments, for example, when an added battery pack 104 is detected in block 310, a battery request flag is set such that a battery pack request is detected in the following block 254.

In another embodiment, the optimal battery selection device 129 within the slotted wireless charger 102*a* detects a battery pack request upon determining that an added tag battery pack 104*a*, attached to the mobile communication device 106, was inserted into one of the charging slots 108. The added tag battery pack 104*a* may communicate this additional information, that the tag battery pack 104*a* is attached to the mobile communication device 106, as part of the block 312, enabling the optimal battery selection device 129 to make this determination in block 254.

In another embodiment, the optimal battery selection device 129 within the wireless charger mat 102*b* detects a battery pack request upon receipt of the battery pack request from the mobile communication device 106. The mobile communication device 106 may generate and send the battery pack request signal via the battery transceiver 173 in response to a user input, for instance, via a graphical user interface or a hard key press, when in communication range of the wireless charger mat 102b.

Figure 8:
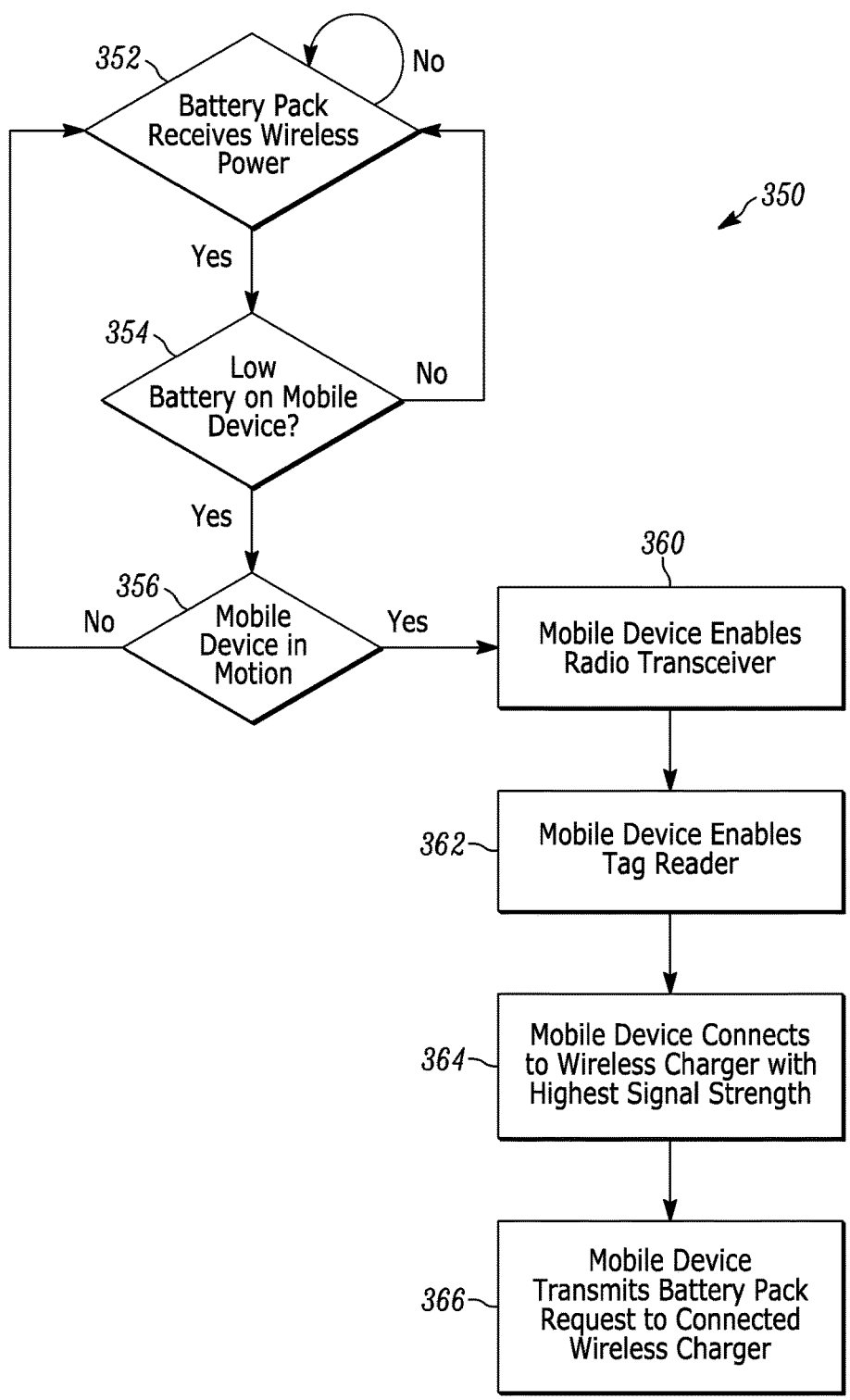
FIG. 8 is a flowchart of a method of generating a battery request in accordance with some embodiments.

Additionally, or alternatively, the mobile communication device 106 may implement the method 350 of FIG. 8 to generate and send the battery pack request signal. In block 352, the mobile communication device 106 determines whether power is being received at the recipient coil 130. For instance, the tag battery controller 160a or transceiver battery controller 160b may receive a signal from a current sensor (not shown) monitoring the charge current induced within the recipient coil 130 indicating that wireless power is being received. The method 350 loops and repeats block 352 until such wireless power is detected. When such wireless power is detected, the mobile communication device 106 proceeds to block 354.

In block 354, the mobile communication device 106 determines whether the charge level of a battery pack 104 attached to the mobile communication device 106 (e.g., the battery pack 104-4) is low. To determine whether the charge level is low, the mobile communication device 106 may receive the charge level from the battery controller 160a or 160b via the electro-mechanical connections between the mobile communication device 106 and the battery pack 104 that is attached thereto. The mobile communication device 106 then compares the charge level to a predetermined threshold. When the battery pack 104 that is attached is above the predetermined threshold, the battery pack 104 is not low, and the method returns to block 352. When the charge level is below the predetermined threshold, the mobile communication device 106 determines that the battery pack 104 that is attached is low, and proceeds to block 356.

In block 356, the mobile communication device 106 determines whether it is in motion. For instance, the mobile communication device includes a motion sensor 358, such as an accelerometer, that provides an output signal to the device controller 186 indicative of a motion level. To determine whether motion is present, the device controller 186 may compare the motion level from the motion sensor 358 to a predetermined threshold. When the motion level is below the predetermined threshold, the method returns to block 352. When the motion level is above the predetermined threshold, the mobile communication device 106 proceeds to block 360.

In block 360, the mobile communication device 106 enables or awakens the device transceiver 180. In block 362, the mobile communication device 106 enables or awakens the tag reader 182 in anticipation of reading indicator dynamic tags 174 of the battery packs 104 on the wireless charger mat 102b, although this action can be delayed until closer to the time of reading.

In block 364, the mobile communication device 106 determines whether multiple wireless charger mats 102b are nearby and within communication range (e.g., based on a scan by the device transceiver 180). If so, the mobile communication device 106 determines a received signal strength indication (RSSI) value for each wireless charger mat 102b within range and connects to the wireless charger mat 102b having the highest signal strength indicated by the received signal strength indication values. In block 366, the mobile communication device 106 transmits the battery pack request to the optimal battery selection device 129 of the wireless charger mat 102b to which the mobile communication device 106 connected in block 364. While method 350 is described with respect the wireless charger mat 102b in certain instances, the method 350 is also applicable to some embodiments of the slotted wireless charger 102a.

In response to receiving the battery pack request from the mobile communication device 106 as described with respect to method 350, returning to FIG. 6, the optimal battery selection device 129 evaluates the decision block of block 254 to be true (i.e., the wireless charger mat 102b detects a battery pack request).

In some instances, where the optimal battery selection device 129 is located on the mobile communication device 106, the wireless charger 102 determines that a battery pack request has been received using one of the above-noted techniques. Thereafter, the wireless charger 102 transmits the battery pack request to the optimal battery selection device 129 on the mobile communication device 106 (e.g., via the device transceiver 180). In some examples, the battery pack request is initially detected by optimal battery selection device 129 on the mobile communication device 106 (e.g., in response to a user's input via a graphical user interface of the mobile communication device 106) and, therefore, the request need not be transmitted by the wireless charger 102 to the optimal selection device 129.

As part of the battery pack request detection in block 254, the optimal battery selection device 129 determines (e.g., based on information provided as part of the request) one or more of the type of the battery pack 104 that initiated the request, the type of the mobile communication device 106 that initiated the request, or the type of the battery pack 104 coupled to the mobile communication device 106. Regardless of the detection technique, after detecting a battery pack request in block 254, the optimal battery selection device 129 proceeds to block 256 to obtain battery information from battery packs 104 present on the wireless charger 102.

In block 256, the optimal battery selection device 129 obtains battery information from the battery packs 104. The battery information includes a battery type and charge level for each battery pack 104 present on the wireless charger 102, including those currently being charged by the wireless charger 102 and those fully charged but not yet removed from the wireless charger 102. The optimal battery selection device 129 of the slotted wireless charger 102a obtains the battery information through a read of each dynamic tag 164 by each corresponding battery tag reader 152. In some instances, the dynamic tag 164 is periodically read by the battery tag reader 152 and a memory within the slot controller 122a is updated upon each read (see, e.g., block 304 of FIG. 7). In turn, the slot controller 122a accesses the memory in block 256 to obtain the most current battery information. In other instances, the battery tag reader 152 initiates a read of the dynamic tag 164 upon reaching and executing block 256.

The optimal battery selection device 129 of the wireless charger mat 102b obtains the battery information through a transmission of the battery information from each battery transceiver 173 to the charger transceiver 170. In some instances, the battery transceiver 173 periodically transmits the battery information to the charger transceiver 170 and the battery information for each battery pack 104 is stored in a memory within the mat controller 122b (see, e.g., block 304 of FIG. 7). The memory is updated upon each transmission such that the optimal battery selection device 129 of the mat controller 122b accesses the memory in block 256 to obtain the most current battery information. The periodic transmission may be unprompted by the wireless charger 102 (a data push) or prompted by the wireless charger 102 (a data pull). In other instances, the battery transceiver 173 transmits, through a data pull or data push, the battery information upon reaching and executing block 256.

In some instances, where the optimal battery selection device 129 is located on the mobile communication device 106, the wireless charger 102 collects the battery information from the battery packs via one the above listed techniques. Thereafter, the wireless charger 102 transmits the battery information to the optimal battery selection device 129 on the mobile communication device 106 (e.g., via the device transceiver 180).

Accordingly, the optimal battery selection device 129 obtains the battery information through periodic data pushes from present battery packs 104, through as-needed or periodic reading or data polling of the battery packs 104 by the wireless charger 102, or both. At the completion of block 256, the optimal battery selection device 129 is aware of the type and charge level of each battery pack 104 present on the wireless charger 102.

In block 258, the wireless charger 102 determines an optimal one of the battery packs 104 (the optimal battery pack) based on the battery pack request and the battery information. To determine the optimal battery pack, the optimal battery selection device 129 determines which of the present battery packs 104, if any, are compatible battery packs. Compatible battery packs are the battery packs 104 that are able to substitute for the battery pack 104 that initiated the request or that are compatible with the mobile communication device 106 that initiated the request. To this end, the optimal battery selection device 129 may include a compatibility database 380 in the memory 202 that takes as input the type of the initiating device (e.g., battery pack 104 or the mobile communication device 106 that initiated the battery pack request) and that outputs a list of one or more types of compatible battery packs. Alternatively, the optimal battery selection device 129 may determine that the types of compatible battery packs includes just the same type as the battery pack 104 that initiated the request or currently powering the mobile communication device 106 that initiated the request.

After determining the types of compatible battery packs, the optimal battery selection device 129 determines whether one or more of the types of the battery packs 104 present on the wireless charger 102 match one or more of the types of compatible battery packs. The battery packs 104 present on the wireless charger 102 determined to match one of the types of compatible battery packs are the battery packs 104 that are compatible (compatible battery packs).

The optimal battery selection device 129 also compares the charge levels of each of the compatible battery packs, received as part of the battery information in block 256, to determine the compatible battery pack having the highest charge level. The optimal battery selection device 129 determines that, of the battery packs 104 present on the wireless charger 102, the compatible battery pack having the highest charge level is the optimal battery pack.

When multiple battery packs 104 are present that are compatible and fully charged, in some embodiments, the optimal battery selection device 129 determines that each of these battery packs 104 is an optimal battery pack. In other embodiments, the optimal battery selection device 129 randomly selects one of the compatible battery packs as the optimal battery pack. In other embodiments, the optimal battery selection device 129 selects as the optimal battery pack the battery pack 104 that it first determines is both compatible and that is fully charged. In still further embodiments, the optimal battery selection device 129 uses further battery information obtained in block 256 to select one of the battery packs 104 that is fully charged and compatible as the optimal battery pack. For instance, the optimal battery selection device 129 selects one of the fully-charged, compatible battery packs as the optimal pack based on one or more of the following additional factors: the manufacture date of the battery pack 104, the capacity of the battery pack 104, the weight of the battery pack 104, and the total charges or discharges experienced by the battery pack 104. Generally, the newer the battery pack, the higher the capacity, the lighter the weight, and the fewer the charges and discharges, the more likely the battery pack will be the optimal battery pack. To determine an optimal battery pack using the additional factors, the optimal battery selection device 129 may assign different weights to the additional factors to prioritize the influence of each factor in the determination (e.g., higher capacity may be considered more important than a lighter pack).

In block 260, the optimal battery selection device 129 provides notification of the optimal battery pack. The notification may result in a human-recognizable indication being provided by one or more of the wireless charger 102, the optimal battery pack itself, and the mobile communication device 106. The slotted wireless charger 102a provides a human-recognizable indication via the charger indicator 150 associated with the charging slot 108 having the battery pack 104 that is the optimal battery pack. For instance, the charger indicator 150 may be a light emitting diode (LED) that flashes, a speaker that beeps, or a vibration generator that vibrates.

In some embodiments, where the wireless charger 102 communicates to the battery packs 104 (e.g., via the charger transceiver 170), the wireless charger 102 sends the notification to one of the battery packs 104 indicating that it is the optimal battery pack. In turn, the battery indicator 166 of the optimal battery pack provides the human-recognizable indication to identify the optimal battery pack, e.g., in response to control signals from the transceiver battery controller 160b.

With respect to the optimal battery selection device residing on wireless charger mat 102b, the optimal battery selection device, upon determining the optimal battery pack, transmits the notification via the charger transceiver 170 to the battery transceiver 173 of the optimal battery pack requesting that an optimal battery pack variable of the indicator dynamic tag 174 be set to TRUE. More particularly, the transceiver battery controller 160b receives the notification from the battery transceiver 173 and writes to the indicator dynamic tag 174 to set the optimal battery pack variable to TRUE. The optimal battery pack variable may be a Boolean variable having either a TRUE or FALSE value. The transceiver battery controller 160b will also start a timer (e.g., of fifteen, thirty, or sixty seconds) and, after expiration of the timer, will write FALSE to the optimal battery pack variable, which is the default state for the variable. Accordingly, at a given moment, the present battery packs 104 will have their optimal battery pack variable within the indicator dynamic tags 174 set to FALSE, unless the notification was recently received from the wireless charger mat 102b.

Next, after the notification is sent, a user places the mobile communication device 106 near (e.g., within about 10 centimeters) one of the transceiver battery packs 104b present on the wireless charger mat 102b. The tag reader 182 of the mobile communication device 106, in turn, reads the indicator dynamic tag 174. When the optimal battery pack variable of the indicator dynamic tag 174 is set to TRUE, the mobile communication device 106 provides a human recognizable indication to the user that the battery pack 104 nearby the mobile communication device 106 is the optimal battery pack. For instance, the device indicator 184 may be a light emitting diode (LED) that flashes, a speaker that beeps, or a vibration generator that vibrates. Alternatively, in some embodiments, the device indicator 184 is implemented by a display screen of the mobile communication device 106 and the screen provides an alphanumeric message (e.g., "the charger suggests this battery pack" or "this is the optimal battery pack").

When the optimal battery pack variable of the indicator dynamic tag 174 is set to FALSE, the mobile communication device 106 either provides no indication or provides a human-recognizable indication via the device indicator 184 that the battery pack 104 nearby the mobile communication device 106 is not the optimal battery pack. For example, the device indicator 184 may be a multi-color light emitting diode that flashes red when the battery pack 104 is not an optimal battery pack, and flashes green when the battery pack 104 is the optimal battery pack.

The user holds the mobile communication device 106 near battery packs 104 present on the wireless charger mat 102b, one at a time, until the device indicator 184 indicates to the user that the transceiver battery pack 104b nearby the mobile communication device 106 is the optimal battery pack.

If no compatible battery pack is present on the wireless charger 102, a human-recognizable indication is provided by the wireless charger 102 of the lack of a substitute battery pack. For instance, the wireless charger 102 may include a no-battery indicator (e.g., light emitting diode, speaker, or vibration generator) that is driven to flash, beep, or vibrate to indicate to a user that no substitute battery pack was found. In some instances, one or more of the charger indicators 150 in the slotted wireless charger 102a are also the no-battery indicators or the mat charger indicator 172 in the wireless charger mat 102b is also the no-battery indicator. For example, the charger indicators 150 may be multi-color light emitting diodes that flash red when no substitute battery is present. In other instances, the no-battery indicator is provided separate from the charger indicators 150 and 172 on the wireless chargers 102a and 102b, respectively.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of selecting a battery pack of a plurality of battery packs being wirelessly charged, the method comprising:
   wirelessly charging the plurality of battery packs using a wireless charger;
   detecting a battery pack request indicating a request to select a replacement battery pack from the plurality of battery packs being wirelessly charged;
   determining a compatible battery pack type based on the request;
   receiving, by an optimal battery selection device via a wireless communication circuit, from the plurality of battery packs, battery information related to a battery type and a charge level for each battery pack of the plurality of battery packs;
   identifying compatible battery packs of the plurality of battery packs based on the battery types of the plurality of battery packs and the compatible battery pack type;
   identifying one of the compatible battery packs as an optimal replacement battery pack by comparing the charge levels of the compatible battery packs; and
   providing, by the optimal battery selection device, a human recognizable notification indicative of the optimal replacement battery pack.

2. The method of claim 1, wherein the battery pack request is detected based on receiving a request transmitted from a mobile communication device.

3. The method of claim 2, wherein the request from the mobile communication device is generated based on a charge level of an attached battery pack coupled to the mobile communication device and a sensed motion of the mobile communication device.

4. The method of claim 1, wherein the battery pack request is detected based on detecting, by the wireless charger, insertion of the plurality of battery packs into a charging slot of the wireless charger.

5. The method of claim 1, further comprising:
   obtaining, from an added battery pack, additional battery information from the added battery pad; and
   determining a compatible battery pack type based on the additional battery information.

6. The method of claim 1, wherein providing the notification of the optimal replacement battery pack comprises at least one selected from the group consisting of:
   driving an indicator associated with a charging slot on the wireless charger having the optimal replacement battery pack; and
   sending the notification to the optimal replacement battery pack to update an indicator dynamic tag of the optimal replacement battery pack to identify the optimal replacement battery pack as the optimal replacement battery pack, the indicator dynamic tab being read by a tag reader of a mobile communication device.

7. The method of claim 1, wherein the optimal battery selection device includes a processor and a memory and is incorporated within one selected from the group consisting of the wireless charger and a mobile communication device.

8. A system for selecting a battery pack of a plurality of battery packs being wirelessly charged, the system comprising:
   a wireless charger including
      a power supply,
      a plurality of charging coils, each charging coil coupled to the power supply and configured to wirelessly charge the battery pack of the plurality of battery packs using power received via the power supply, and
      a wireless communication circuit forming a communication link with each battery pack; and
   an optimal battery selection device
      having battery information related to the plurality of battery packs including information received from the plurality of battery packs via the wireless communication circuit the battery information including a battery type and a charge level for each battery pack of the plurality of battery packs, and
      configured to:
         detect a battery pack request indicating a request to select a replacement battery pack from the plurality of battery packs being wirelessly charged,
         determine a compatible battery pack type based on the request,
         identify compatible battery packs of the plurality of battery packs based on the battery types of the plurality of battery packs and the compatible battery pack type,
         identify one of the compatible battery packs as an optimal replacement battery pack by comparing the charge levels of the compatible battery packs, and
         provide a human recognizable notification indicative of the optimal replacement battery pack.

9. The system of claim 8, wherein the wireless charger further includes charging slots, each configured to receive one of the plurality of battery packs.

10. The system of claim 9, wherein the wireless charger further includes a plurality of battery tag readers forming the wireless communication circuit, wherein
   each battery tag reader is associated with one of the charging slots, and
   the optimal battery selection device detects the battery pack request upon the battery tag reader associated with one of the charging slots reading a dynamic tag of one of the plurality of battery packs inserted into the one of the charging slots.

11. The system of claim 9, wherein the wireless charger further includes a plurality of battery tag readers forming the wireless communication circuit, wherein each battery tag reader is associated with one of the charging slots and configured to read a dynamic tag of one of the plurality of battery packs inserted into the associated one of the charging slots to obtain the battery information.

12. The system of claim 9, wherein the wireless charger further includes a plurality of charger indicators, wherein each charger indicator is associated with one of the charging slots and is configured to provide a human-recognizable indication of the optimal replacement battery pack in response to receiving the notification.

13. The system of claim 8, wherein the wireless charger further includes a charging mat with a charging surface configured to receive the plurality of battery packs.

14. The system of claim 13, wherein the wireless communication circuit receives the battery pack request from a radio transceiver in a mobile communication device configured to receive and be powered by one of the plurality of battery packs.

15. The system of claim 14, wherein the battery pack request from the radio transceiver is generated based on a charge level of an attached battery pack coupled to the mobile communication device and based on sensed motion of the mobile communication device.

16. The system of claim 13, wherein the wireless communication circuit receives the battery information including the battery type and the charge level from a battery transceiver in each of the plurality of battery packs.

17. The system of claim 13, wherein the optimal replacement battery pack includes a dynamic tag storing an value indicative of selection as the optimal replacement battery pack in response to receipt of the notification.

18. The system of claim 17, further comprising a mobile communication device, wherein the mobile communication device includes a tag reader configured to read the dynamic tag of the optimal replacement battery pack and, in response, to provide a human-recognizable indication of the optimal replacement battery pack.

19. The system of claim 13, wherein, to determine the optimal replacement battery pack, the optimal battery selection device determines whether the optimal replacement battery pack is compatible with a mobile communication device and whether the optimal replacement battery pack has a charge level above a predetermined threshold.

20. The system of claim 8, wherein the optimal battery selection device includes a processor and a memory and is incorporated within one selected from the group consisting of the wireless charger and a mobile communication device.

* * * * *